US009090237B2

(12) United States Patent      (10) Patent No.: US 9,090,237 B2
Iwagami      (45) Date of Patent: Jul. 28, 2015

(54) ELECTRONIC CONTROL UNIT

(71) Applicant: Nidec Elesys Corporation, Yokohama-shi, Kanagawa (JP)

(72) Inventor: Naoki Iwagami, Yokohama (JP)

(73) Assignee: NIDEC ELESYS CORPORATION, Yokohama-Shi (JP)

( * ) Notice: Subject to any disclaimer, the term of this patent is extended or adjusted under 35 U.S.C. 154(b) by 0 days.

(21) Appl. No.: 14/291,293

(22) Filed: May 30, 2014

(65) Prior Publication Data
US 2014/0358365 A1    Dec. 4, 2014

(30) Foreign Application Priority Data
May 31, 2013    (JP) ................................. 2013-116318

(51) Int. Cl.
*B60T 8/88* (2006.01)
*B60T 17/18* (2006.01)
*B60T 1/10* (2006.01)

(52) U.S. Cl.
CPC . *B60T 8/885* (2013.01); *B60T 1/10* (2013.01); *B60T 17/18* (2013.01); *B60T 2270/406* (2013.01); *B60T 2270/415* (2013.01); *B60T 2270/604* (2013.01)

(58) Field of Classification Search
CPC ........... B60T 8/885; B60T 1/10; B60T 17/18; B60T 2270/406; B60T 2270/415; B60T 2270/604
See application file for complete search history.

(56) References Cited

U.S. PATENT DOCUMENTS

2004/0160122 A1*  8/2004  Yokoyama et al. ............ 307/9.1

FOREIGN PATENT DOCUMENTS

JP      2000-108887      4/2000

\* cited by examiner

*Primary Examiner* — Thomas Tarcza
*Assistant Examiner* — Kevin Myhre
(74) *Attorney, Agent, or Firm* — Rankin, Hill & Clark LLP

(57) ABSTRACT

An electronic control unit includes a controller configured to interrupt a failsafe relay for a predetermined time period while an external load, such as an electric servo motor, is in a non-operating state and to perform a diagnosis of a short-circuit fault, which may occur at a load power supply line, based on a difference between a first voltage applied to a positive power supply line and a second voltage applied to the load power supply line.

6 Claims, 5 Drawing Sheets

ELECTRONIC CONTROL UNIT

FIELD OF THE INVENTION

The present invention relates to an electronic control unit suitable for use in an electric servo brake system installed in a vehicle having a regenerative brake function.

BACKGROUND OF THE INVENTION

In a vehicle having a regenerative brake function, a drive motor doubles in function as a motor for traveling the vehicle and a generator for regeneration. When the vehicle is in deceleration, the drive motor converts deceleration energy into electric power to thereby generate a regenerative braking force. More specifically, recovery of electricity begins from the moment the driver releases its foot from an accelerator pedal. When a brake pedal is stepped on or operated, deceleration of the vehicle is enhanced and a greater amount of electricity is created and charged into an on-vehicle battery. In order to realize a regenerative brake function, the vehicle is equipped with an electric servo brake system which cooperates with a drive electronic control unit (drive ECU) in performing regenerative control.

In an electronic control unit having a motor load, such as the electric servo brake system having a regenerative brake function, an electrolytic capacitor for removing ripples is provided, with one end grounded, in a load power supply line connected to a positive terminal of the on-vehicle battery. Also connected to the load power supply line is a failsafe relay which interrupts electric power from the on-vehicle battery in case of emergency. Upon operation of the failsafe relay, the motor load is separated from the on-vehicle battery with the result that a load circuit is protected from a fault such as an overcurrent fault.

The electronic control unit may encounter a ground fault which occurs at an arbitrary part or position of the load power supply line. The load power supply line is used herein to refer to a power supply line which extends from a downstream end of the failsafe relay to the motor load. When a ground fault occurs at an arbitrary part or position of the load power supply line, a constant resistance component is set between the arbitrary position of the load power supply line and the grounded vehicle body. Conventionally, a current flowing in such ground-fault position is detected by monitoring with a special current detecting device such as a shunt resistance or a Hall element, as disclosed, for example, in Japanese Patent Application Laid-open Publication (JP-A) No. 2000-108887. According to another known ground-fault detection method, a voltage drop at the ground-fault position is monitored.

However, the conventional ground-fault detection method using a current detecting device requires a dedicated circuit having a current detecting function and, hence, is disadvantageous in terms of the cost and component packaging density. Furthermore, the ground-fault detection method relying on voltage monitoring at the ground-fault position involves a reduction in detection performance when a voltage drop resulting from a ground-fault does not reach a prescribed detection threshold value.

It is therefore an object of the present invention to provide an electronic control unit which is capable of improving detection performance against a ground-fault having a resistance component without requiring a dedicated current detecting circuit.

SUMMARY OF THE INVENTION

According to one aspect of the present invention, there is provided an electronic control unit comprising: a failsafe relay connected via a first line to an on-vehicle battery and configured to interrupt electric power supply to a load connected via a second line to the failsafe relay; a capacitive element connected at one end thereof to the second line and grounded at an opposite end thereof; and a controller that monitors respective voltages of the first line and the second line on both sides of the failsafe relay, wherein the controller diagnoses a short-circuit fault, which may occur at an arbitrary part of the second line, based on a difference between a first voltage of the first line and a second voltage of the second line when the failsafe relay is interrupted for a predetermined time period while the load connected to the second line is in a non-operating state.

With this arrangement, the controller interrupts the failsafe relay for the predetermined time period while the load is in the non-operating state, and performs a diagnosis of a short-circuit fault, which may occur at the second line, based on the difference between the first voltage of the first line and the second voltage of the second line. When a ground-fault has occurred, the second voltage of the second line can be reduced at a constant inclination or gradient by the capacitive element. From the difference between the first voltage and the second voltage, a short-circuit fault diagnosis can be achieved. In this instance, the capacitive element uses existing hardware and the diagnosis processing is realized by software with the result that the need for a dedicated circuit for current detection can be eliminated, which contributes to reduction in the cost and component packaging density. Additionally, since the failure diagnosis is executed during the non-operating state of the load, the diagnosis processing does not give any influence on the operation of the load.

Preferably, when the short-circuit fault is detected, the controller interrupts the failsafe relay, and when the short-circuit fault is not detected, the controller releases interruption of the failsafe relay for the predetermined time period. Since the failsafe relay is interrupted when a short-circuit fault is detected by the diagnosis processing, the load connected to the second line and circuits inside the electronic control unit can be protected with reliability.

Preferably, the controller repeats a diagnosis of the short-circuit fault by a prescribed number of times at a constant cycle and, when the short-circuit fault is detected continuously by a predetermined number of times, the controller determines the detection result and notifies the detection result to the outside. Since the diagnosis of the short-circuit fault is repeated by the predetermined number of times at the constant cycle and, when the short-circuit fault is detected by the predetermined number of times, the detection result is determined, the short-circuit fault diagnosis can be achieved with high reliability.

Preferably, the controller prohibits the diagnosis of the short-circuit fault according to a variation width of the voltage of the first line before and after the failsafe relay is interrupted. With this arrangement, when the voltage of the on-vehicle battery varies while the failsafe relay is interrupted, the diagnosis of the short-circuit fault is temporarily prohibited according to a variation width of the on-vehicle battery voltage. This will further improve the reliability of the fault diagnosis.

BRIEF DESCRIPTION OF THE DRAWINGS

A certain preferred structural embodiment of the present invention will be described in detail below, by way of example only, with reference to the accompanying drawings, in which like reference numerals designate like parts and in which.

DETAILED DESCRIPTION OF THE PREFERRED EMBODIMENT

Figure 1:
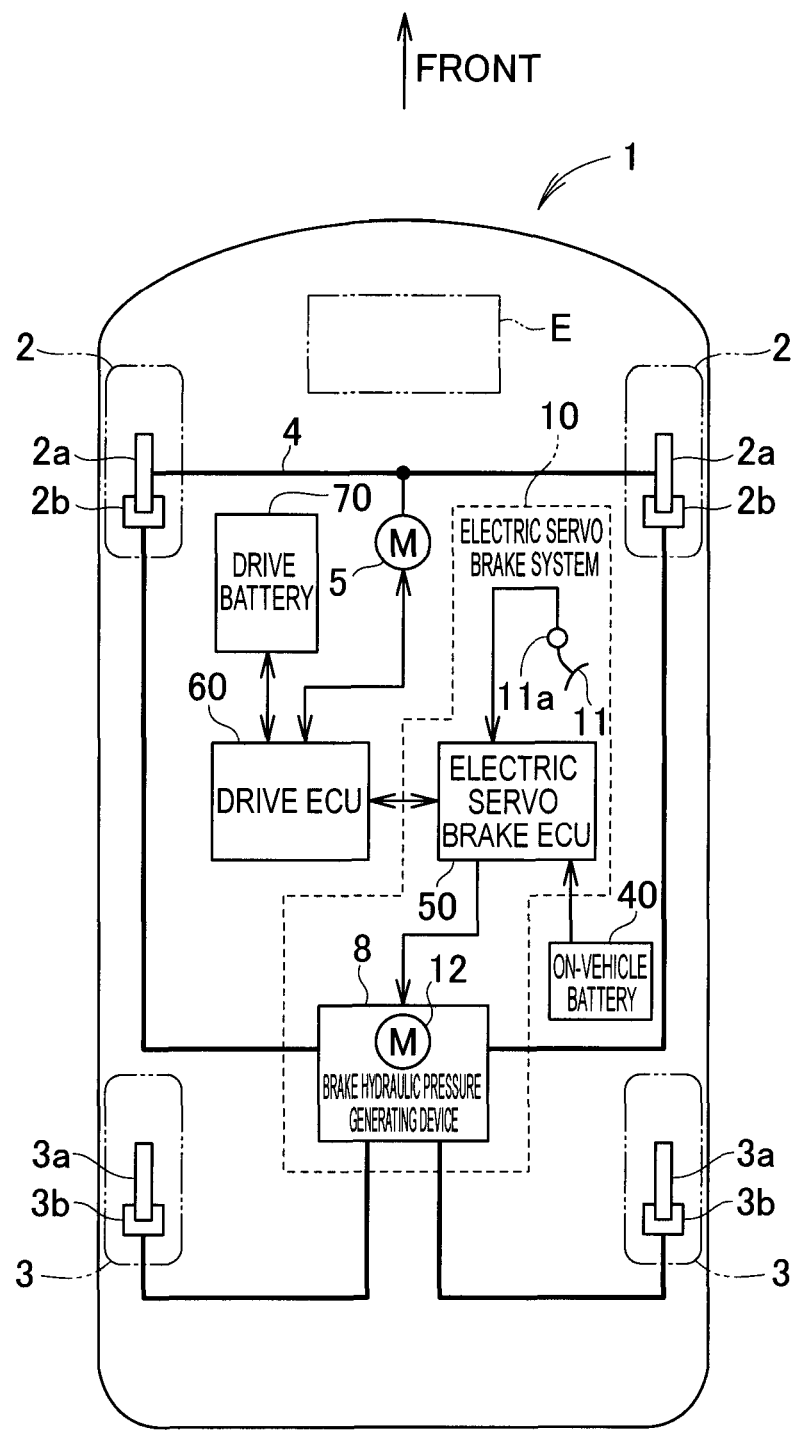
FIG. 1 is a diagrammatical view showing a general construction of a vehicle in which an electronic control unit embodying the present invention is installed.

FIG. 1 diagrammatically shows a general construction of a vehicle 1 in which an electronic control unit (ECU for an electric servo brake) according to an embodiment of the present invention is installed. As shown in FIG. 1, the vehicle 1 includes right and left front wheels 2, 2 provided on a front part of the vehicle 1, and right and left rear wheels 3, 3 provided on a rear part of the vehicle 1. The right and left front wheels 2, 2 are connected to a front axle 4, and a drive motor 5 is connected to the front axle 4 such that torque can be transmitted from the drive motor 5 to the front axle 4. The front axle 4 is provided with a differential mechanism (not shown).

The drive motor 5 is connected in electric circuit with a drive battery 70 having a relatively large capacity. The drive motor 5 and the drive battery 70 are connected with a drive electronic control unit (drive ECU) 60 such that under the control by the drive ECU 60, electric power from the drive battery 70 is supplied to the drive motor 5, and electric power generated by the drive motor 5 is supplied or charged into the drive battery 70. The drive motor 5 doubles in function as an electric motor for vehicle traveling and a generator for regeneration. When the vehicle is in deceleration, the drive motor 5 converts deceleration energy into electric power to thereby generate a regenerative braking force. More specifically, recovery of electricity begins from the moment the driver releases its foot from an accelerator pedal. When a brake pedal 11 is stepped on or operated, deceleration by the drive motor is enhanced so that a larger amount of electricity is created and changed into the drive battery 70.

The drive ECU has a built-in central processing unit (CPU) which performs regenerative cooperative control where regenerative braking and hydraulic braking are combined. For electric vehicles, the construction shown in FIG. 1 can be used. As an alternative, a rear drive motor for driving rear wheels 3 can be provided. In the case where the vehicle 1 is a hybrid vehicle, the front axle 4 is coupled with an output shaft of an engine (internal combustion engine) E shown by phantom lines in FIG. 1. In the embodiment shown in FIG. 1, the engine E is used for driving the front wheels 2. The engine E may be used for driving four wheels (front and rear wheels) 2, 3.

Each wheel of the front and rear wheels 2, 3 is provided with a disk brake known per se, which is comprised of a disk 2a, 3a integral with the wheel (front wheel 2 or rear wheel 3) and a caliper equipped with a wheel cylinder 2b, 3b. The wheel cylinders 2b, 3b are connected via known brake lines to a brake hydraulic pressure generating device 8. A vehicle stability assist (VSA) system (not shown) is disposed downstream of the brake hydraulic pressure generating device 8. The VSA system operates to increase or decrease the braking pressure on each individual wheel.

The brake pedal 11 is provided with a pedal position sensor 11a for detecting a position of the brake pedal 11. The pedal position sensor 11a is able to detect a pedal operation amount (brake operation amount) of the brake pedal 11, which represents an amount of depression of the brake pedal 11 by the driver, and which increases from the initial state where the brake pedal 11 is not stepped on or operated (petal position=0). A detection signal from the pedal position sensor 11a is supplied to an electronic control unit (ECU) 50 for an electric servo brake (hereinafter referred to as "electric servo brake ECU 50).

An electric servo brake system 10 includes the electric servo brake ECU 50 and cooperates with the drive ECU 60 in performing regenerative control. The electric servo brake ECU 50 detects a pedal operation amount of the brake pedal 11 by the pedal sensor 11a and, on the basis of the detected pedal operation amount, drives a motor-driven cylinder (not shown) of the brake hydraulic pressure generating device 8 to thereby produce a brake hydraulic pressure. The brake hydraulic pressure generating device 8 includes an electric servo motor (hereinafter referred to as "external load") 12. The electric servo brake ECU 50 is supplied with electric power from an on-vehicle battery 40. The electric servo brake ECU 50 functions as a control unit or controller that diagnoses a short-circuit fault, which may occur at an arbitrary part of a second line (load power supply line 57 shown in FIG. 2), based on a difference between a first voltage of a first line (positive power supply line 56 shown in FIG. 2) and a second voltage of the second line 57 when a failsafe relay (FSR) 53 (FIG. 2) is interrupted for a prescribed time period while the external load 12 connected to the second line 57 is in a non-operating state. The diagnosis function of the electric servo brake ECU 50 will be described below in greater detail.

Figure 2:
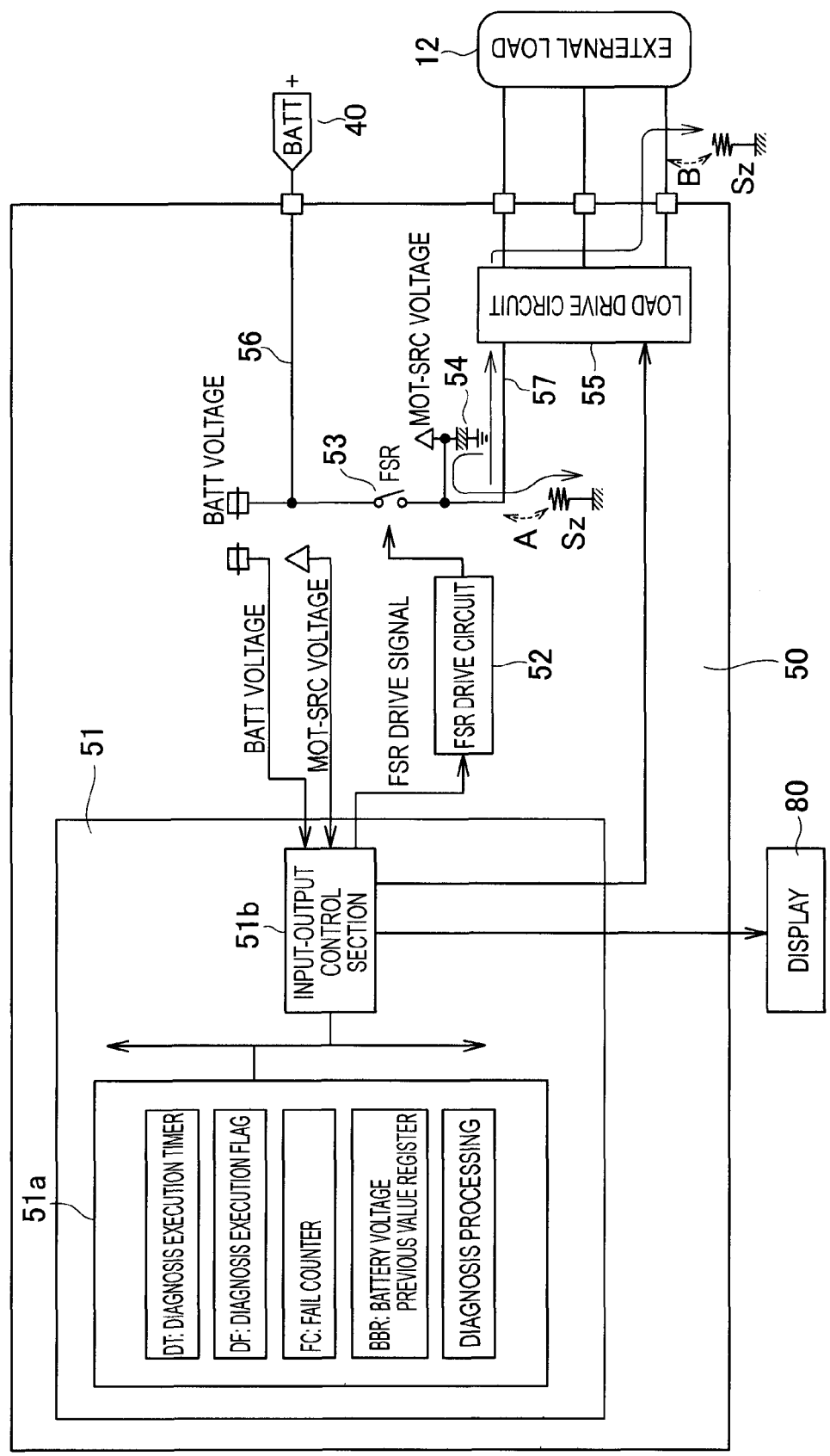
FIG. 2 is a block diagram showing a configuration of the electronic control unit of the present invention.

FIG. 2 is a block diagram showing an internal circuit configuration of the electric servo brake ECU 50. As shown in FIG. 2, the electric servo brake ECU 50 includes a control part or controller 51, a failsafe relay drive circuit 52 (hereinafter referred to, for brevity, as "FSR drive circuit 52"), a failsafe relay 53 (hereinafter referred to, for brevity, as "FSR 53"), an electrolytic capacitor (capacitive element) 54, and a load drive circuit 55.

The FSR 53 is provided for cutting off or interrupting electric power in case of emergency. The FSR 53 has one end connected to the positive power supply line 56 connected to the positive terminal BATT+ of the on-vehicle battery 40, an opposite end of the FSR 53 being connected to the load power supply line 57. The electrolytic capacitor 54 is used mainly for the purpose of smoothing. The electrolytic capacitor 54 is connected at one end thereof to the load power supply line 57, an opposite end of the electrolytic capacitor 54 being grounded.

The controller 51 monitors a voltage of the positive power supply line 56 and a voltage of the load power supply line 57 on both ends of the FSR 53. More specifically, the controller 51 diagnoses a short-circuit fault, which may occur at an arbitrary part or position of the load power supply line 57, based on a difference between a first voltage (battery voltage) of the positive power supply line 56 and a second voltage (MOT-SRC voltage) appearing when the FSR 53 is interrupted for a predetermined time period while the external load 12 such as the drive motor connected to the load power supply line 57 is in the non-operating state. Here, the short-circuiting fault which may occur at an arbitrary part or position of the load power supply line 57 includes a ground-fault A having an impedance Sz, which may occur, for example, in the electronic servo brake ECU 50, and a ground-fault B having an impedance Sz which may occur at any phase line of an electric servo motor connected as the external load 12.

The controller 51 includes an arithmetic control part or section 51a and an input/output control part or section 51b. The arithmetic control section 51a manages a diagnosis execution timer (DT), a diagnosis execution flag (DF), a fail counter (FC), and a battery voltage previous value (BBR) by a random access memory (RAM), for example, allocated to a program. The arithmetic control section 51a diagnoses a short-circuit fault which may occur at an arbitrary part or position of the load power supply line 57 based on a difference between the first voltage of the positive power supply line 56 and the second voltage of the load power supply line 57 when the FSR 53 is interrupted for a predetermined time period while the drive motor connected to the load power supply line 57 is in the non-operating state. To this end, the arithmetic control section 51a performs control of the FSR drive circuit 52 via the input/output control section 51b and retrieves the first voltage (BATT voltage) and the second voltage (MOT-SRC voltage) via the input/output control section 51b.

The load drive circuit 55 is constituted by, for example, a three-phase bridge circuit for driving the electric servo motor forming the external load 12. The load drive circuit 55 includes six semiconductor switching elements and is connected to the load power supply line 57. The three-phase bridge circuit may be formed by a plurality of switching transistors, such as insulated gate bipolar transistors (IGBTs) other than field effects transistors (FETs). The external load 12 includes solenoid valves provided in the brake hydraulic pressure generating device 8 additional to the electric servo motor.

The input/output control section 51b is connected with a display 80 such as a meter. The arithmetic control section 51a repeats a diagnosis of the short-circuit fault by a prescribed number of times at a constant cycle and, when the short-circuit fault is detected continuously by a predetermined number of times, the arithmetic control section determines the detection result and notifies the detection result to the outside. In this instance, the detection result is notified to the display 80.

Figure 3:
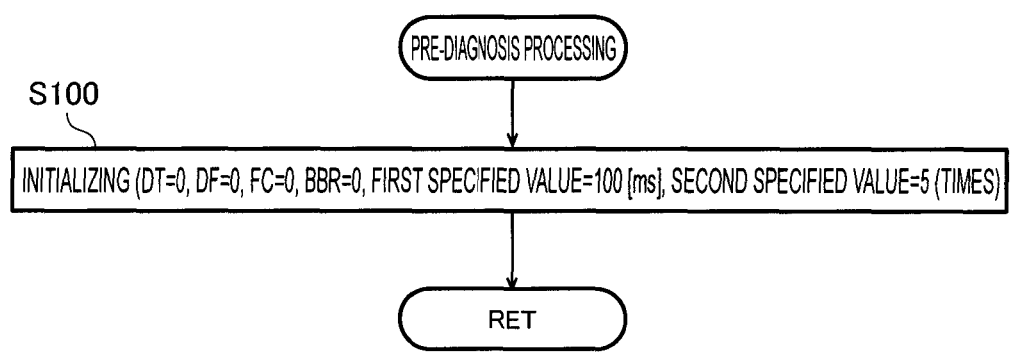
FIG. 3 is a flowchart showing operations of a pre-diagnosis processing achieved by the electronic control unit.
Figure 4:
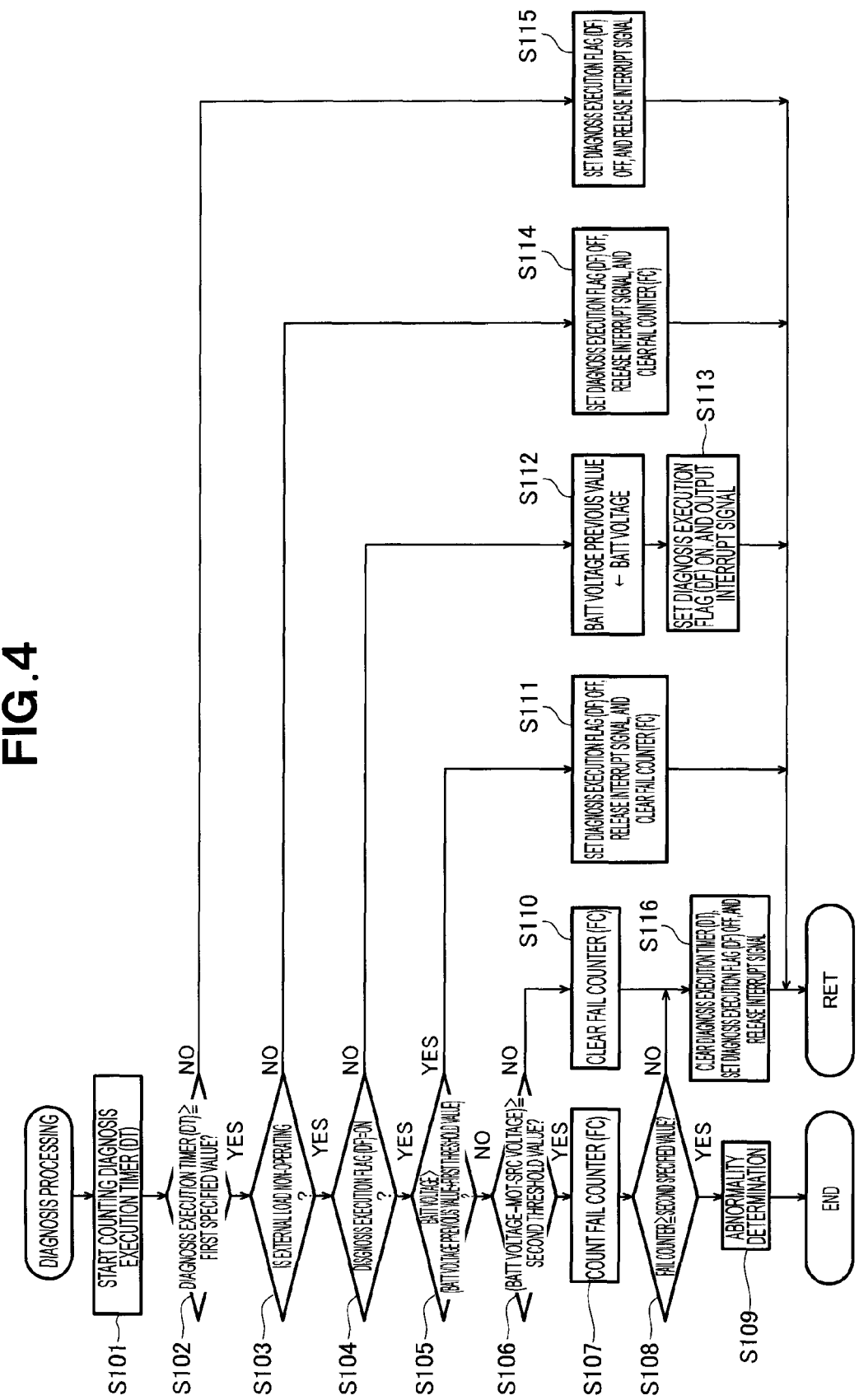
FIG. 4 is a flowchart showing operations of a diagnosis processing achieved by the electronic control unit.

Referring next to FIGS. 3 and 4, diagnosis processing operation performed by the electric servo brake ECU 50 shown in FIG. 2 will be described below in greater detail. FIG. 3 shows operations of a pre-diagnosis processing, and FIG. 4 shows operations of a diagnosis processing.

The controller 51 (arithmetic control section 51a) initializes internal counters, flags and registers before the diagnosis processing is performed. In this instance, the diagnosis execution timer DT is set to an initial value "0", the diagnosis execution flag DF is set to a default value "0", the fail counter FC is set to an initial value "0", the battery voltage previous value BBR is set to an initial vale "0", a first specified value is set to "100" ms, and a second specified value is set to "5" times (step S100). The arithmetic control section 51a sets a diagnosis cycle to 100 ms and determines abnormality due to a ground-fault of the load power supply line 57 when the ground-fault is detected continuously by five times.

In executing the diagnosis processing, the arithmetic control section 51a starts time-counting by the diagnosis execution timer DT (step S101), as shown in FIG. 1. The arithmetic control section 51a compares the first specified value 100 ms with the time-count value (step S102). When the time-count value is equal to or greater than the first specified value 100 ms ("YES" determination at step S102), the arithmetic control section 51 further determines as to whether the external load 12 is not operating (step S103). Alternatively, when the time-count value is less than the first specified value 100 ("NO" determination at step S102), the diagnosis execution flag DF is set OFF and a release state of an interrupt signal is maintained so that the FSR drive circuit 52 is controlled to release an interrupt signal supplied to the FSR 53 (step S115).

The arithmetic control section 51a determines whether or not the drive motor as the external load 12 is not operating (step S103). When the external load 12 is operating ("NO" determination at step S103), the arithmetic control section 51a set the diagnosis execution flag DF OFF to thereby release the interrupt signal to the FSR53 and clears the fail counter FC, in order to temporarily stop the diagnosis processing (step S114).

When the external load 12 is not operating ("YES" determination at step S103), the arithmetic control section further determines whether or not the diagnosis execution flag DF in ON (step S104). When the diagnosis execution flag DF is not ON ("NO" determination at step S104), the arithmetic control section 51a sets a measured value of the battery voltage to the battery voltage previous value register BBR before the FSR 53 is interrupted (step S112) and subsequently sets the diagnosis execution flag DF ON and outputs an interrupt signal via the input-output control section 51b to thereby interrupt the FSR 53 (step S113). Alternatively, when the diagnosis execution flag DF is ON ("YES" determination at step S104), the arithmetic control section 51a compares the battery voltage with the total value of the previous value and a first threshold value to thereby monitor an increase in the battery voltage that may occur due to alternator power generation (step S105).

When the battery voltage exceeds the total value of the previous value and the first threshold value ("YES" determination at step S105), the arithmetic control section 51a sets the diagnosis execution flag DF OFF to thereby prohibit the diagnosis processing, releases the FSR interrupt signal, and clears the fail counter FC in order to prevent erroneous detection of a short-circuit fault (step S111). When the battery voltage is increased, the MOT-SRC voltage apparently decreases relatively to the battery voltage. Operation at step S111 is therefore a measure taken in order to temporarily prohibit the diagnosis processing according to a variation width of the battery voltage before and after the FSR53 is interrupted.

Alternatively, when the battery voltage is equal to or smaller than the total value of the previous value and the first threshold value ("NO" determination at step S105), the arithmetic control section 51a compares a value subtracting the MOT-SRC voltage from the battery voltage with a second threshold value (step S106). When the value subtracting the MOT-SRC voltage from the battery voltage is equal to or greater than the second threshold value ("YES" determination at step S106), the arithmetic control section 51a counts the fail counter FC and repeats the diagnosis processing (step S107). Alternatively, when the value subtracting the MOT-SRC voltage from the battery voltage is less than the second threshold value ("NO" determination at step S106), the fail counter FC is cleared (step S110).

Then the arithmetic control section 51a clears the diagnosis execution timer DT, sets the diagnosis execution flag DF OFF, and releases the FSR interrupt signal (step S116), and the diagnosis processing is repeated.

When the fail counter FC is renewed at step S107, the arithmetic control section 51a compares a count value of the fail counter FC with the specified value "5" (step S108). When the count value of the fail counter FC is equal to or greater than the specified value ("YES" determination at step S108), abnormality determination processing is executed and the diagnosis processing is terminated (step S109). The abnormality determination processing is herein defined as a process in which through the input/output control section 51b, the FSR 53 is interrupted by the FSR drive circuit 52 and a short-circuit fault is notified to the display 80. Alternatively, when the count value of the fail counter FC is less than the specified value "5" ("NO" determination at step S108), the arithmetic control section 51a clears the diagnosis execution timer DT, sets the diagnosis execution flag DF OFF, and releases the RSR interrupt signal (step S116), and the diagnosis processing is repeated.

When the load supply line 57 does not involve a ground-fault, the MOT-SRC voltage does not decline relative to the battery voltage. Alternatively, when a ground-fault has occurred at the load supply line 57, the MOT-SRC voltage drops by a voltage which is determined by a time required to turn off the FSR 53, a ground-fault current, and the capacitance of the electrolytic capacitor 54. This voltage drop is detected by the diagnosis processing achieved by the arithmetic control section 51a, and by repeating the diagnosis processing by a number of times which is specified by the fail counter FC, abnormality caused due to the ground-fault is determined.

Figure 5:
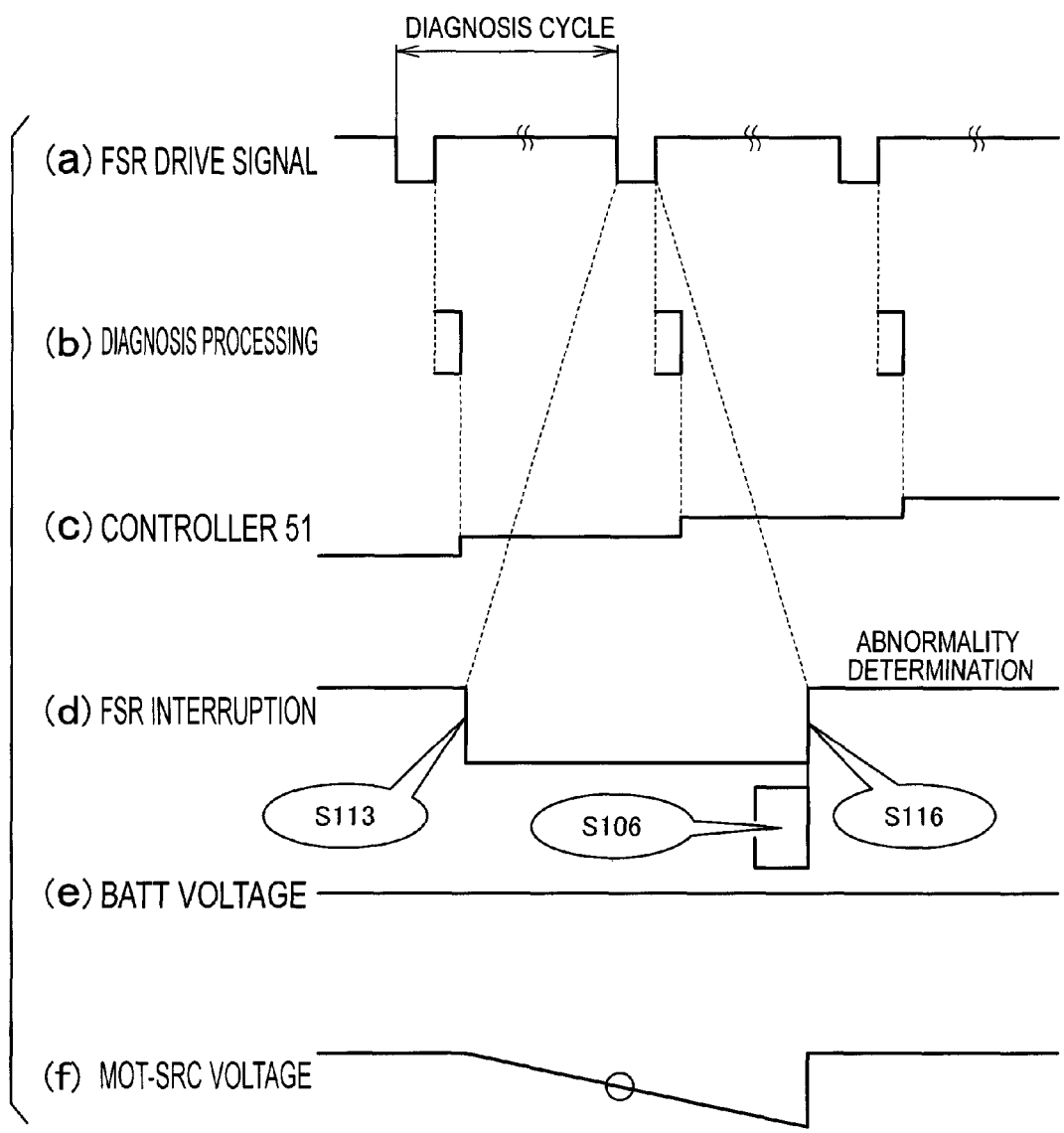
FIG. 5 is a timing chart showing operations of the electronic control unit.

FIG. 5 is a timing chart showing the operations of the electric servo brake ECU 50 according to the embodiment of the present invention. As shown in FIG. 5, before starting the diagnosis processing, the controller 51 outputs an FSR drive signal (interrupt signal) to the FSR drive circuit 52 so as to interrupt the FSR 53 for a prescribed time period, for example, 2 ms while the drive motor (external load) 12 is not operating (see (a) and (d) of FIG. 5). After the prescribed time period (2 ms), the battery voltage and the MOT-SRC voltage of the load power supply line 57 are monitored and the interrupt signal to the FSR drive circuit 52 is released.

When the load power supply line 57 has not encountered a ground-fault, the MOT-SRC voltage does not decline relative to the battery voltage. Alternatively, when a ground-fault has occurred at the load power supply line 27, the MOT-SRC voltage drops by a voltage which is determined by a time period required to turn off the FSR 53, a ground-fault current, and the capacity of the electrolytic capacitor 54 (see (e) and (f) of FIG. 5). This voltage drop is detected by the diagnosis processing repeated by a specified number of times (five times) and abnormality due to the ground-fault is diagnosed (see (b) and (c) of FIG. 5).

It may occur that when the battery voltage increases due to alternator power generator while the FSR 53 is interrupted, the MOT-SRC voltages apparently declines relative to the battery voltages and this voltage drop is erroneously determined as a ground-fault. To avoid such erroneous determination, a process is added, wherein the diagnosis processing is temporarily prohibited according to a variation width of the battery voltage before and after the FSR 53 is interrupted. The diagnosis cycle is determined such that the diagnosis processing is repeated at a frequency, for example, once per each second, within a range in which the load power supply line 57 is able to accept an overcurrent and normal operation of the drive motor is not affected.

As thus far described, according to the electric servo brake ECU 50 embodying the invention, the controller 51 interrupts the FSR 53 for a predetermined time period while the drive motor forming the external load 12 is in the non-operating state, and on the basis of a difference between a first voltage on the first line (positive power supply line) 56 and a second voltage of the second line (load power supply line) 57, the controller 51 performs a diagnosis of a short-circuit fault which may occur at the second line. With this arrangement, the second voltage applied to the second line at a time a ground-fault occurs can be reduced at a constant inclination or gradient by the capacitive element (electrolytic capacitor) 54 and, based on the difference between the thus reduced first voltage (second voltage) and the first voltage of the first line, the fault diagnosis can be achieved. In this instance, the electrolytic capacitor 54 provided for ripple-removing purposes can be used as the capacitive element, and the diagnosis can be realized by software. This arrangement eliminates the need for a dedicated current detection circuit, which will contribute to reduction in the cost and component packaging density. Additionally, since the fault diagnosis is executed while the external load 12 is in the non-operating state, operation of the external load 12 is not affected by the fault diagnosis.

According to the electric servo brake ECU 50 of the invention, when a short-circuit fault is detected by the diagnosis, the controller 51 interrupts the FSR 53 to thereby protect the load 12 connected to the second line and circuits inside the ECU 50. Additionally, since the diagnosis of the short-circuit fault is repeated by the prescribed number of times at the constant cycle and, when the short-circuit fault is detected continuously by the predetermined number of times, the detection result is determined, the short-circuit fault diagnosis can be achieved with high reliability. Furthermore, when the voltage of the on-vehicle battery 40 is caused to vary due to alternator power generation occurring while the FSR 53 is interrupted, the diagnosis of the short-circuit fault is temporarily prohibited according to a variation width of the on-vehicle battery voltage. This arrangement further enhances the reliability of the fault diagnosis.

The electric servo brake ECU 50 has been described in conjunction with an embodiment in which an external load (electric servo motor) 12 is driven. The electric servo brake ECU 50 can be effectively used in an application where solenoid valves are to be controlled. In the latter case, the diagnosis cycle is selected within a range which is acceptable to the load power supply line 57, so that the diagnosis processing can be achieved without affecting the external load. The electric servo brake ECU has been described in conjunction with a ground-fault diagnosis processing, however, the ECU can be also effectively used for a diagnosis of a short-circuit fault.

Obviously, various minor changes and modifications of the present invention are possible in the light of the above teaching. It is therefore to be understood that within the scope of the appended claims the invention may be practiced otherwise than as specifically described.

What is claimed is:

1. An electronic control unit comprising:
   a failsafe relay connected via a first line to an on-vehicle battery and configured to interrupt electric power supply to a load connected via a second line to the failsafe relay;
   a capacitive element connected at one end thereof to the second line and grounded at an opposite end thereof; and
   a controller that monitors respective voltages of the first line and the second line on both sides of the failsafe relay,
   wherein the controller diagnoses a short-circuit fault, which may occur at an arbitrary part of the second line, based on a difference between a first voltage of the first line and a second voltage of the second line when the failsafe relay is interrupted for a predetermined time period while the load connected to the second line is in a non-operating state.

2. The electronic control unit according to claim 1, wherein when the short-circuit fault is detected, the controller interrupts the failsafe relay, and when the short-circuit fault is not detected, the controller releases interruption of the failsafe relay for the predetermined time period.

3. The electronic control unit according to claim 1, wherein the controller repeats a diagnosis of the short-circuit fault by a prescribed number of times at a constant cycle and, when the short-circuit fault is detected continuously by a predetermined number of times, the controller determines the detection result and notifies the detection result to the outside.

4. The electronic control unit according to claim 3, wherein the controller prohibits the diagnosis of the short-circuit fault according to a variation width of the voltage of the first line before and after the failsafe relay is interrupted.

5. The electronic control unit according to claim 2, wherein the controller repeats a diagnosis of the short-circuit fault by a prescribed number of times at a constant cycle and, when the short-circuit fault is detected continuously by a predetermined number of times, the controller determines the detection result and notifies the detection result to the outside.

6. The electric control unit according to claim 5, wherein the controller prohibits the diagnosis of the short-circuit fault according to a variation width of the voltage of the first line before and after the failsafe relay is interrupted.

* * * * *